United States Patent [19]

Link

[11] Patent Number: 4,584,774
[45] Date of Patent: Apr. 29, 1986

[54] STEP GAUGE FOR SETTING UP WOOD WORKING TOOLS FOR SPECIALTY PROCESSING

[76] Inventor: Glennie W. Link, 14329 - 12th SW., Seattle, Wash. 98166

[21] Appl. No.: 674,913

[22] Filed: Nov. 26, 1984

[51] Int. Cl.⁴ .............................................. G01B 3/30
[52] U.S. Cl. ............................... 33/168 R; 33/185 R; 33/202
[58] Field of Search ................ 33/185 R, 202, 168 R, 33/168 B, 169 R

[56] References Cited

U.S. PATENT DOCUMENTS

| | | | |
|---|---|---|---|
| 489,584 | 1/1893 | Havener | 33/168 R |
| 741,146 | 10/1903 | Labofish | 33/168 R |
| 1,034,547 | 8/1912 | Welsh | 33/168 R |
| 1,580,187 | 5/1921 | Brose | 33/168 R |
| 2,637,110 | 5/1953 | Gilbertson | 33/476 |
| 2,823,461 | 2/1958 | Schneider | 33/202 X |
| 2,883,753 | 4/1959 | Schoenmaker | 33/476 |
| 3,201,873 | 8/1965 | Bell et al. | 33/168 R |
| 3,805,390 | 4/1974 | Craig | 33/494 X |

FOREIGN PATENT DOCUMENTS 349357  5/1931  United Kingdom ............. 33/168 R

Primary Examiner—Harry N. Haroian
Attorney, Agent, or Firm—Norman E. Reitz

[57] ABSTRACT

A step gauge for setting up wood working power tools. The gauge has a planar surface on which a series of measurement steps is arranged in opposition to a reference edge. The surfaces of the steps are located at known fixed distances from the reference edge. In use the reference edge is placed against the table, fence or guide of a wood working power tool. When the tip or side of the blade or bit is rested against the edge of a given step the associated known fixed distance becomes the desired measurement. Specialty notches are provided interspersed with the series of measurement steps in order to allow the setup of specialty lumber processing; in the reference edge to permit the setup of joiners; and in the reference edge in aligned opposition to one of the measurement steps to function in cooperation with the reference edge as a square.

3 Claims, 6 Drawing Figures

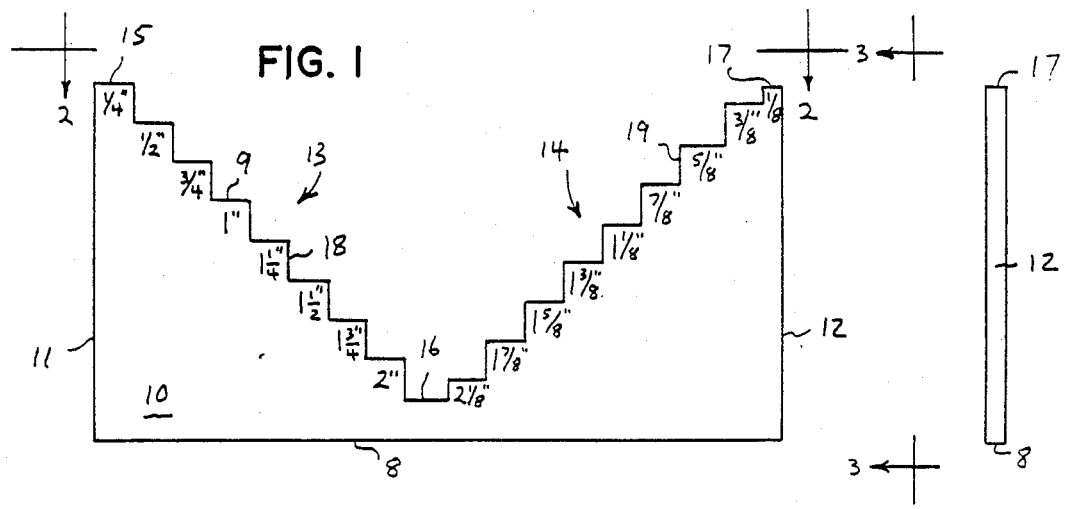
FIG. 1
FIG. 3
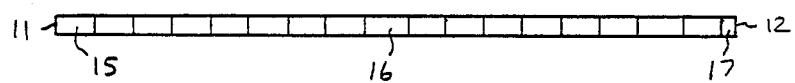
FIG. 2
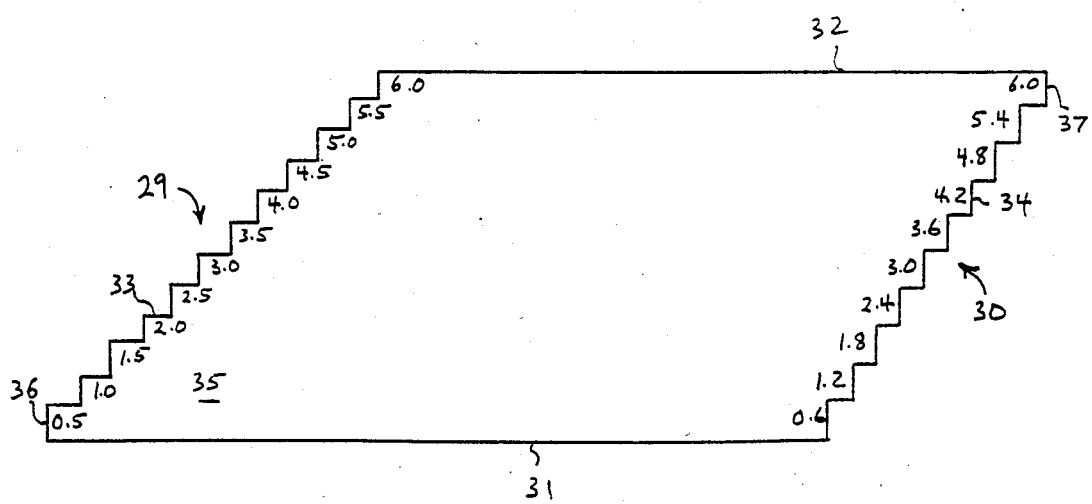
FIG. 4

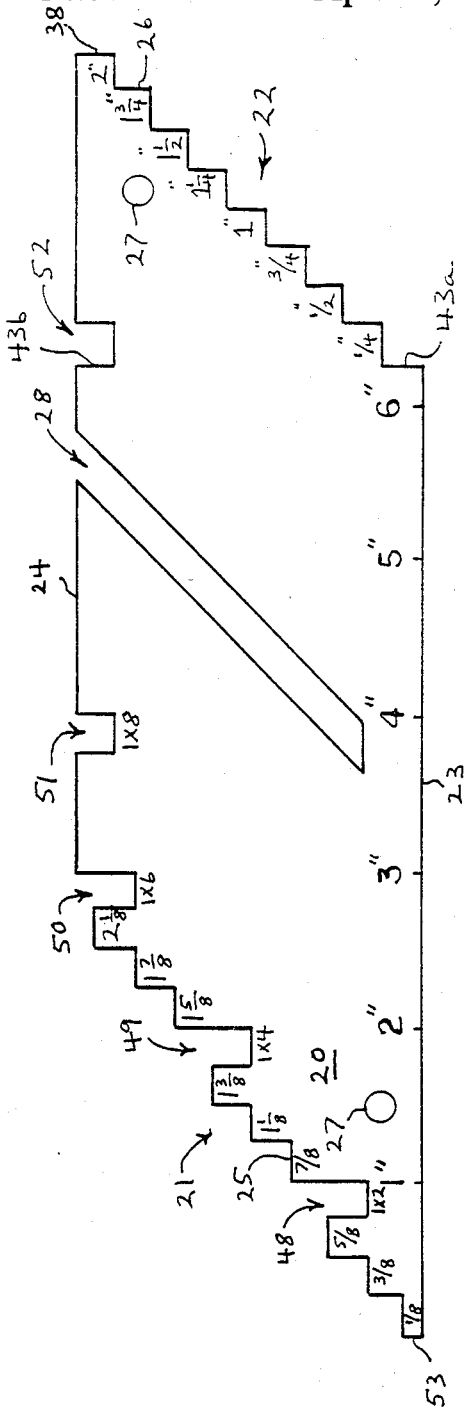
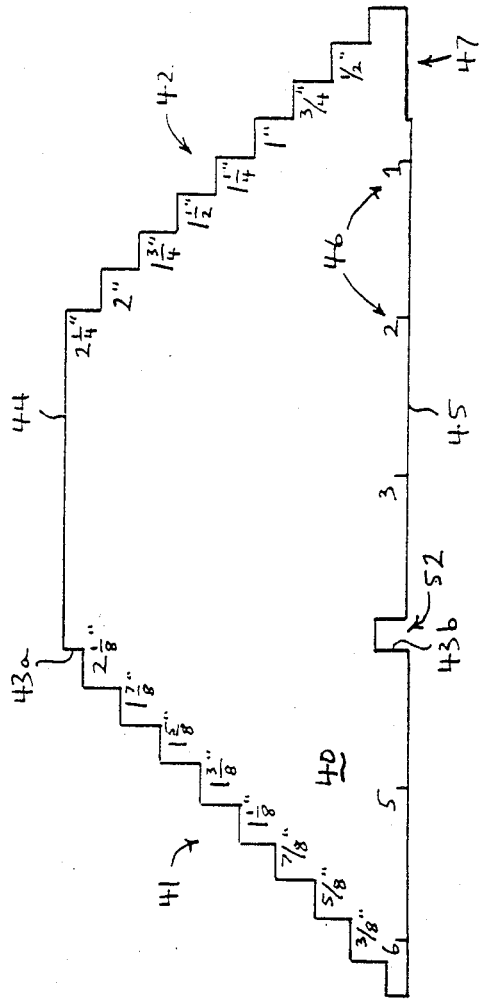
FIG. 5
FIG. 6

STEP GAUGE FOR SETTING UP WOOD WORKING TOOLS FOR SPECIALTY PROCESSING

This invention relates to an improved gauge for setting up wood working tools and particularly, relates to a gauge having a series of measurement steps for setting the initial position and extent of travel of blades and bits in wood working tools and specialty notches for setting up for specialty lumber processing; for setting up joiners and for serving as a square.

Due to the availability of reliable and inexpensive electric motors and to the demand generated by amateur woodworkers and home handymen, various types of power wood working tools are widely and readily available. For example, table saws, radial arm saws, band saws, routers, shapers, joiners, sabre saws and the like are affordable to most homeowners and hobbyists. Typically, the homeowner or hobbyist will use a sawblade or a bit until it is worn out and then they will replace it; occasionally they will have it professionally sharpened. Their primary interest, then, in the actual use of the sawblade or bit is the position at which the wood is first contacted and the subsequent direction and extent of travel. For a saw blade the width and depth of cut is of primary concern.

Sawyers gauges of various types have been used to set up different aspects of the cuts of saw blades. The setting of the dimensions and orientations of individual teeth were the object of numerous gauges which were used particularly with straight, manually operated saws. See, for example, J. P. Arnold, "Model for Setting and Filing Saws", U.S. Pat. No. 1,259,216; G. S. Black, "Sawyers Gage", U.S. Pat. No. 292,465; F. V. Schroeder, "Saw Setting Gage", U.S. Pat. No. 1,543,687. The height of a table saw blade (and therefore the depth of cut) has been measured by an adjustable reference strip with the height being indicated by the position of the edge of the strip along a rule in O. K. Mullen, "Height Indicating Guide", U.S. Pat. No. 3,295,586. Operation of the gauge required the loosening of a nut, adjustment of the position of the strip and the tightening of the nut- a cumbersome sequence.

Fixed measurements of the dimensions of sawn lumber have been made by lumber rule heads used in lumber yards. See E. M. Conway, et. al., "Lumber Rule Head", U.S. Pat. No. 209,231. These have allowed the grading of lumber once it has been cut, not the setting up of saws to cut lumber to a desired dimension. A general purpose set up gauge would allow saw blades, as well as wood working bits, to be set up in wood working tools. It would be especially useful to have such a means for quickly and conveniently setting up the blades and bits in modern wood working tools.

It is therefore an object of the present invention to provide a gauge for quickly and reliably setting the initial position and extent of travel of the blades and bits of modern wood working power tools.

It is another object of the present invention to provide a step gauge which has a series of measurement steps positioned in opposition to a reference edge.

It is a further object of the present invention to provide a gauge having a series of measurement steps arranged in cascading progression at distances from a reference edge which are standard lengths for wood to allow the set up of the blades and bits of wood working power tools.

BRIEF DESCRIPTION OF THE DRAWINGS

For a more complete understanding of the present invention reference may be had to the accompanying drawings which are incorporated herein by reference and in which:

FIG. 1 is a front view of the step gauge of the present invention;

FIG. 2 is a top edge view of the step gauge of FIG. 1;

FIG. 3 is a side edge view of the step gauge of FIG. 1;

FIG. 4 is a front view of an alternate embodiment of the step gauge;

FIG. 5 is a front view of a variation of the embodiment of FIG. 4; and

FIG. 6 is a front view of a further embodiment of the step gauge.

SUMMARY OF THE INVENTION

A step gauge is provided for the ready and reliable setting up of wood working power tools. The gauge permits the original position and extent of travel of blades and bits to be predetermined. A planar member has at least one reference edge which may be placed against the table of a table saw for setting the depth of cut of the saw blade or adjacent the starting position of a drill to asertain the depth of penetration of the drill-bit. A series of measurement steps are provided in staggered fashion opposite the reference edge. Each measurement step is located a fixed distance from the reference edge. When the tip of the blade or end of the bit rests against a given step the associated fixed distance becomes the desired measurement.

DESCRIPTION OF THE PREFERRED EMBODIMENT

The proliferation of power tools and particularly the widespread use of wood working power tools by homeowners, amateur woodworkers and handymen has created a need for set up devices which are easy to use. A versatile device that is susceptible to use on different types of wood working power tools is preferred and is possible since the same principle applies in each case; what is required is a distance measurement from the blade or bit to a reference surface. For the depth of cut or routing the distance will be measured between the tip of the blade or bit and a surface such as the table of a table saw, router, shaper or joiner. For the width of cut or routing the distance will be measured between the side of a blade or bit and a reference surface such as the side of a rip fence.

The step gauge of the present invention allows the depth and width of cut or depth of penetration of a blade or bit to be set with respect to a reference surface. A progression of fixed distances are arranged between a reference edge and particular measurement steps. The progression may be in inches such as $\frac{1}{8}''$, $\frac{3}{8}''$, $\frac{5}{8}''$ ... $1\frac{7}{8}''$ or $\frac{1}{4}''$, $\frac{1}{2}''$, $\frac{3}{4}''$ ... $2''$. Or the progression may be in metric units such as 0.5 cm, 1 cm ... 6 cm. These progressions and other fixed distances will be described subsequently and are shown in the Figures.

As seen in FIG. 1 the step gauge may take the form of an inverted pyramid having a first series of measurement steps 13 and second series of measurement steps 14. For the first series of measurement steps 13 the edge 11 serves as a reference edge. Thus, if reference edge 11 is placed against the rip fence on a table saw or is rested against the guide of other types of wood working power tools then a particular one of the measurement steps in series 13 can be placed against the blade or bit to set the width of cut or routing. If the side of the blade or bit were placed against vertical step surface 18 of series 13 then the width of cut would be 1¼". A similar setup procedure may be followed for the series of measurement steps 14, providing the associated reference edge 12 is utilized. Thus, if reference edge 12 were placed against a rip fence or guide and vertical step surface 19 were placed against the side of a blade or bit the width of cut would be selected to be ⅜". For the two series of measurement steps 13 and 14 different progressions of standard fixed distances have been used. For series of measurement steps 13 the progression is ¼", ½", ¾" ... 2"; for series of measurement steps 14 the progression is ⅛", ⅜", ⅝" ... 2⅛".

The depth of cut of a blade or bit may also be set by the step gauge of FIG. 1. To do so, the horizontal surfaces of the steps, which are parallel to bottom reference edge 8 are used rather than those which are oriented in parallel to reference edges 11 and 12. Thus, to produce a depth of cut of 1" on a table saw, router, shaper the top horizontal surfaces 15 and 17 of series 13 and 14, respectively, are rested on the surface of the table. The height of the blade or bit and/or the position of the fence is adjusted until it rests against the horizontal surface 9 of the 1" measurement step. A similar procedure is followed for depth of cut settings for the series of measurement steps 14. For setting the depth of cut on radial arm saws it is necessary to use the bottom reference edge 8 of the gauge 10. Here, the distance from bottom reference edge 8 to the horizontally disposed step surfaces, such as horizontal step surface 9 are determined and indicated on the surface of the gauge (not shown on FIG. 1). Bottom reference edge 8 is then placed on the surface of the support table and the tip of the blade or bit is lowered to touch the appropriate horizontal step surface. It can be seen that various progressions of standard fixed distances can be incorporated in a single step gauge and configured to meet, for example, in a central connection step 16, by carefully selecting the location of reference edges 11, 12, 15 and 17, and 8 and appropriately arranging the surfaces (horizontal and vertical) of the measurement steps. However, the inverted pyramid configuration 10 of FIGS. 1–3, is primarily suited for setting up saws and is not particularly suitable for setting up routers, shapers or joiners since the wide open section between surfaces 15 and 17 will not bridge the holes on table surfaces or in fences or guides.

An improved embodiment of the gauge of the present invention is shown in FIG. 4; here the fixed distances are shown to be in centimeters. The shape of the gauge 35 is that of a parallelepiped. The two series of measurement steps are on the outside and arranged parallel to each other. The series of measurement steps 29 is arranged on the left hand side and is comprised of regular 0.5 cm steps in the progression 0.5, 1.0, 1.5 ... 6.0 cm. The reference edge for the horizontal surfaces of the steps in series 29 is bottom reference edge 31, although top reference edge 32 could be used by subtracting the designated value from 6.0 cm. Thus, horizontal surface 33 of the step marked 2.0 cm would be 4.0 cm (6.0 cm-2.0 cm) from top reference edge 32. The series of measurement steps 30 illustrate the use of irregular steps. The vertical step heights progress in 0.6 cm increments while the horizontal step heights progress in 0.4 cm increments. The distances are marked with respect to bottom reference edge 31. Alternately, the horizontal steps of 0.4 cm each could be marked with respect to either vertical step surface 36 or vertical step surface 37. In the later case the vertical step surface 34 would be 1.8 cm from reference edge 37. The embodiment of FIG. 4 is structurally strong since it has no narrowed central section where the sides of the inverted pyramid converge, as in FIG. 1. As with the embodiment of FIG. 6, the embodiment of FIG. 4 is highly versatile since it may be used to set the blades or bits of all manner of wood working tools without any interference by the complementary series of measurement steps, as occurs in the embodiment of FIG. 1.

An alternate improved embodiment of the present invention is shown in FIG. 5. The shape of improved embodiment 20 is also that of a parallelepiped. The first series of measurement steps 21 and the second series of measurement steps 22 are located on the left and right outside edges, respectively, of the gauge. The fixed distances may be measured from either bottom reference edge 23 or top reference edge 24. The markings for the fixed distances as shown are the distances measured from reference edge 23. Since both series of measurement steps are on the outside, the structure making up one series does not obstruct the use of the other series. Thus, the depth of cut of a table saw or router may be set by resting bottom reference edge 23 on the table support and moving the tip of the blade or bit up to the level of the horizontal surface of the appropriated measurement step. Thus, with reference edge 23 sitting on the table support and tip of the blade or bit at the height of horizontal surface 25 the depth of cut will be ⅞". The width of the cut or routing tract may be set, for example, by resting reference surface 38 against a guide bar and nesting the side of the blade or bit against vertical step surface 26 to produce a ¼" width of cut. Holes 27 are provided to permit the gauge to be hung from a nail or peg. A channel 28 whose sides make an angle of 45° with both top reference edge 24 and bottom reference edge 23 in order to permit the setting of blades or bits so as to cut, for example, the corners of picture frames. The feature of standard lumber measurements is provided along reference edge 23. The widths respectively, for 1×2s, 1×4s, and 1×6s may be set up by taking the distance from the vertical edge 53 of the first step of measurement series 21 to the long vertical edge, respectively, of notches 48, 49 and 50. The width of 1×8s may be taken by the distance from vertical edge 53 to the most remote vertical edge of notch 51. Reference edge 23 is configured as a six inch rule and may be used as a straight edge. In addition, a true square may be taken by using either reference edges 23 or 24 in conjunction with surfaces 43a and 43b.

In FIG. 6 an embodiment incorporating a trapezoidal shape is shown. The gauge 40 has two series of measurement steps, 41 and 42, along the oblique outside edges. The advantages of FIGS. 4 and 5 are obtained in that the presence of one series of measurment steps does not interfere with the use of the other series of steps. The distances are marked from reference edge 45, although reference edge 44 may also be used. In addition, a six inch rule with indicia 46 shown to be incorporated along reference edge 45. And a square may be obtained by using either of reference steps 44 and 45 in conjunction with vertical surfaces 43a and 43b, formed in notch 52. A notch 47, for example of nominal depth 1/32", may be used to set up joiners. The depth is shallow as joiners are used only to finish lumber to size, remove warps or to plane rough lumber. Various additional configurations of the present invention may also be employed. A single series of measurement steps may be employed along one outside edge to thereby allow two or three reference edges at convenient locations around the perimeter of the gauge. The gauges are typically made of metal for strength and to resist potential abrasion from wood working blades or bits. If constructed from plastic the gauges should be thicker to provide equivalent structural strength. Other configurations, as come within the appended claims, are conteplated by this specification.

I claim:

1. An improved step gauge for setting the depth or width of blades or bits of wood working tools, the gauge having a planar surface with at least one reference edge and another edge at right angles thereto, a series of measurement steps configured along said another edge with each of the steps in the series of measurement steps having at least one surface which is located a known fixed distance from the reference edge, the known fixed distance of successive steps progressively increasing from the reference edge in regular increments, the improvement comprising: specialty notches on said gauge, said specialty notches including a sequence of notches which are interspersed among said measurement steps, each of said notches in said sequence of notches having at least one surface located a fixed distance from said another reference edge which is a fraction of standard lumber dimensions to set up the specialty processing of standard lumber pieces.

2. An improved step gauge in accordance with claim 1 wherein the improvement further comprises a specialty notch which is a shallow notch located at one end of said reference edge to permit the setting up of joiners.

3. An improved step gauge in accordance with claim 2 wherein the improvement further comprises a specialty notch in said reference edge located in aligned opposition to one of said steps in said series of measurements steps, a surface of said specialty notch in said reference edge being orthogonal to said reference edge and a surface of said one of said steps in said series of measurement steps being orthogonal to said reference edge, whereby said orthogonal surface of said specialty notch and said orthogonal surface of said measurement edge may be used with said reference edge as a square.

* * * * *